US012634945B2

(12) United States Patent
Gerami et al.

(10) Patent No.: US 12,634,945 B2
(45) Date of Patent: May 19, 2026

(54) RESOURCE ALLOCATION FOR TRANSMISSION OF UCI

(71) Applicant: Telefonaktiebolaget LM Ericsson (publ), Stockholm (SE)

(72) Inventors: Majid Gerami, Lund (SE); Bikramjit Singh, Raasepori (FI); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 306 days.

(21) Appl. No.: 18/557,716

(22) PCT Filed: Apr. 30, 2021

(86) PCT No.: PCT/SE2021/050405
§ 371 (c)(1),
(2) Date: Oct. 27, 2023

(87) PCT Pub. No.: WO2022/231490
PCT Pub. Date: Nov. 3, 2022

(65) Prior Publication Data
US 2024/0215032 A1 Jun. 27, 2024

(51) Int. Cl.
H04W 72/00 (2023.01)
H04W 8/22 (2009.01)
(Continued)

(52) U.S. Cl.
CPC ............. H04W 72/21 (2023.01); H04W 8/22 (2013.01); H04W 72/566 (2023.01)

(58) Field of Classification Search
CPC ..... H04W 72/21; H04W 8/22; H04W 72/566; H04L 1/1671; H04L 1/1861;
(Continued)

(56) References Cited

U.S. PATENT DOCUMENTS

2018/0278398 A1* 9/2018 Ahn ...................... H04L 1/1671
2019/0174517 A1* 6/2019 Wang ................... H04L 5/0094
(Continued)

FOREIGN PATENT DOCUMENTS

CN 110933751 A 3/2020
WO 2013170639 A1 11/2013
(Continued)

OTHER PUBLICATIONS

Extended European Search Report dated Dec. 13, 2024 issued in corresponding European Application No. 21939497.0, consisting of 7 pages.
(Continued)

*Primary Examiner* — Pakee Fang
(74) *Attorney, Agent, or Firm* — Weisberg I.P. Law, P.A.

(57) ABSTRACT

Embodiments of the present disclosure provide a method, a user equipment, UE, a network node, and a computer program product for resource allocation for transmission of uplink control information, UCI, in a wireless communication network. The method is performed in a UE in the wireless communication network. The method includes transmitting a request message to the network node having information indicating that the UE has UCI to transmit which requires one or more UCI resources. The method also includes receiving an indication of one or more allocated UCI resources from the network node in response to the transmission of the request message. The method further includes transmitting the UCI using the one or more allocated UCI resources. Corresponding base station, UE, and computer program products are also disclosed.

11 Claims, 9 Drawing Sheets

(51) Int. Cl.
  *H04W 72/21*          (2023.01)
  *H04W 72/566*        (2023.01)
(58) Field of Classification Search
  CPC ..... H04L 5/0007; H04L 5/001; H04L 5/0058;
                                H04L 5/0094; H04L 5/0053
  See application file for complete search history.

(56)                   References Cited

U.S. PATENT DOCUMENTS

| | | | |
|---|---|---|---|
| 2020/0077423 A1 | 3/2020 | Park et al. | |
| 2020/0221445 A1 | 7/2020 | Tsai | |
| 2021/0105126 A1 | 4/2021 | et al. | |
| 2021/0235442 A1* | 7/2021 | Li | ........................ H04W 52/325 |
| 2024/0188086 A1* | 6/2024 | Li | ......................... H04L 5/0055 |

FOREIGN PATENT DOCUMENTS

| | | | |
|---|---|---|---|
| WO | 2018174765 A1 | 9/2018 |
| WO | 2019143229 A1 | 7/2019 |
| WO | 2020143526 A1 | 7/2020 |

OTHER PUBLICATIONS

International Search Report and Written Opinion dated Dec. 14, 2021 for International Application No. PCT/SE2021/050405 filed Apr. 30, 2021; consisting of 16 pages.
3GPP TS 38.213 V16.2.0; 3rd Generation Partnership Project; Technical Specification Group Radio Access Network; NR; Physical layer procedures for control (Release 16); Jun. 2020; consisting of 176 pages.

* cited by examiner

100

100

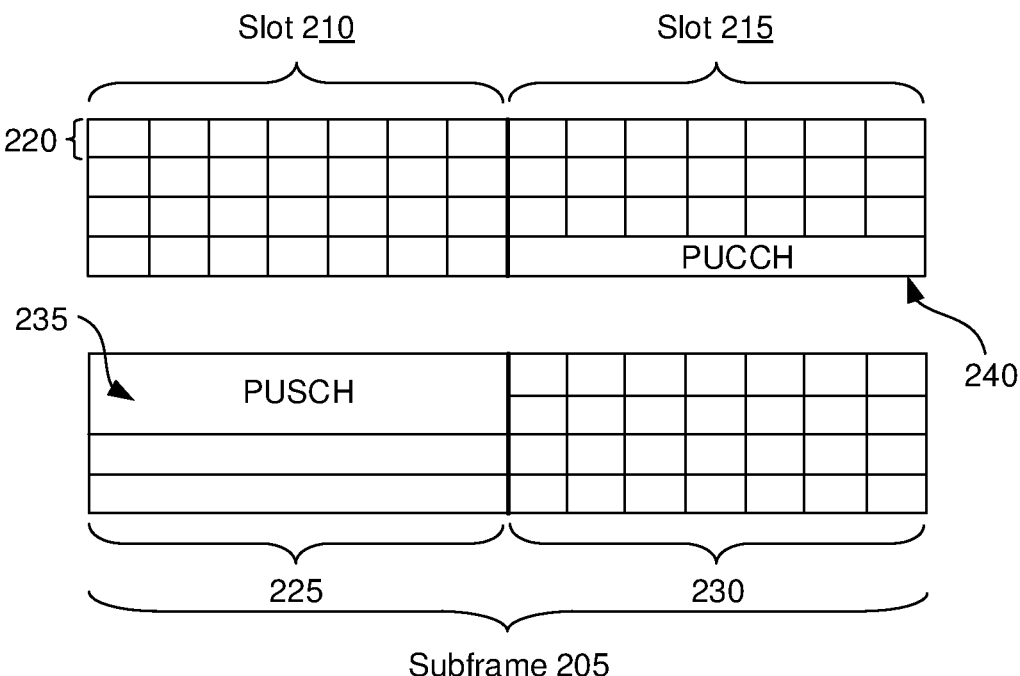
FIG. 2A

Periodicity

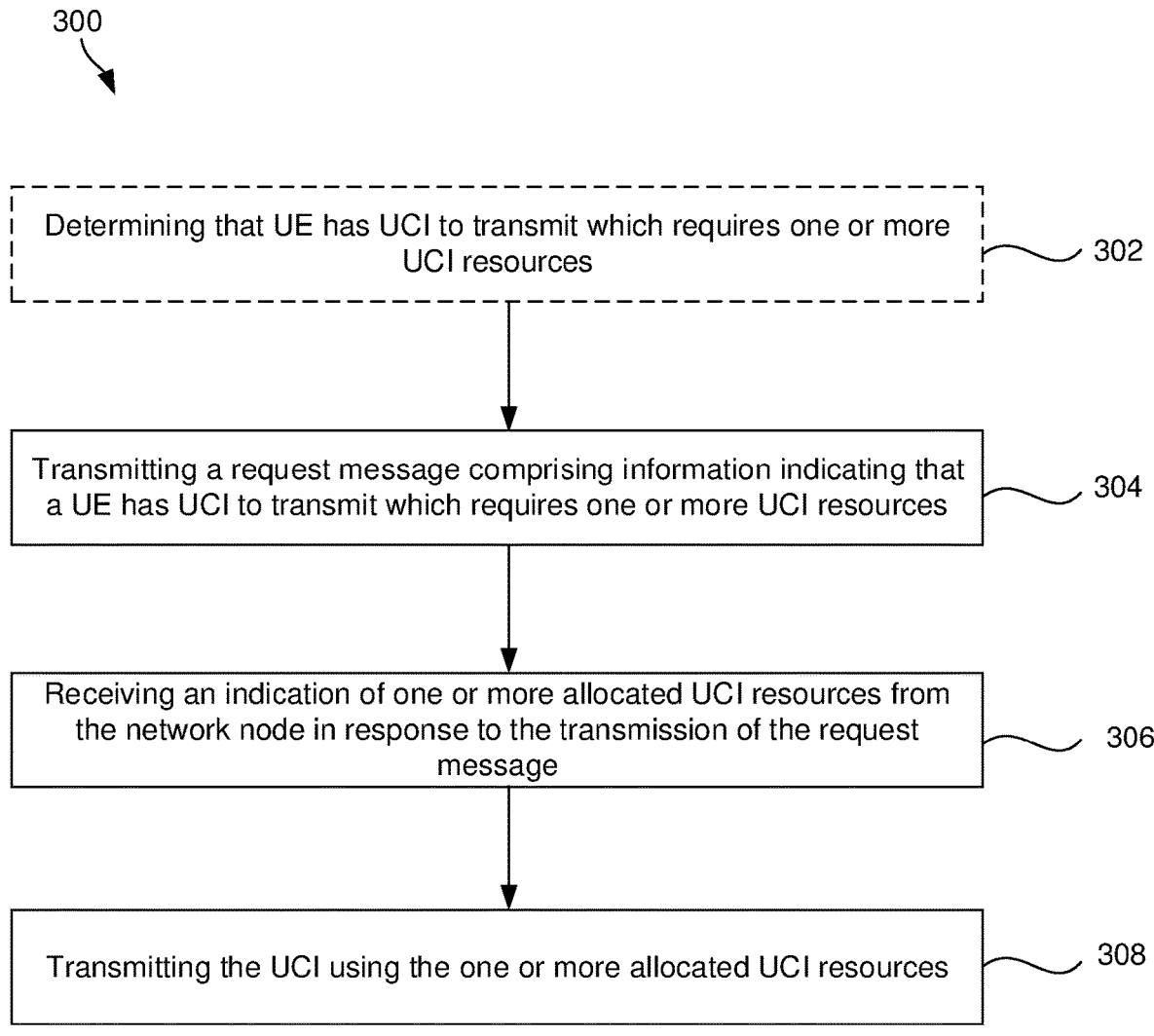

300

Determining that UE has UCI to transmit which requires one or more UCI resources — 302

Transmitting a request message comprising information indicating that a UE has UCI to transmit which requires one or more UCI resources — 304

Receiving an indication of one or more allocated UCI resources from the network node in response to the transmission of the request message — 306

Transmitting the UCI using the one or more allocated UCI resources — 308

FIG. 3

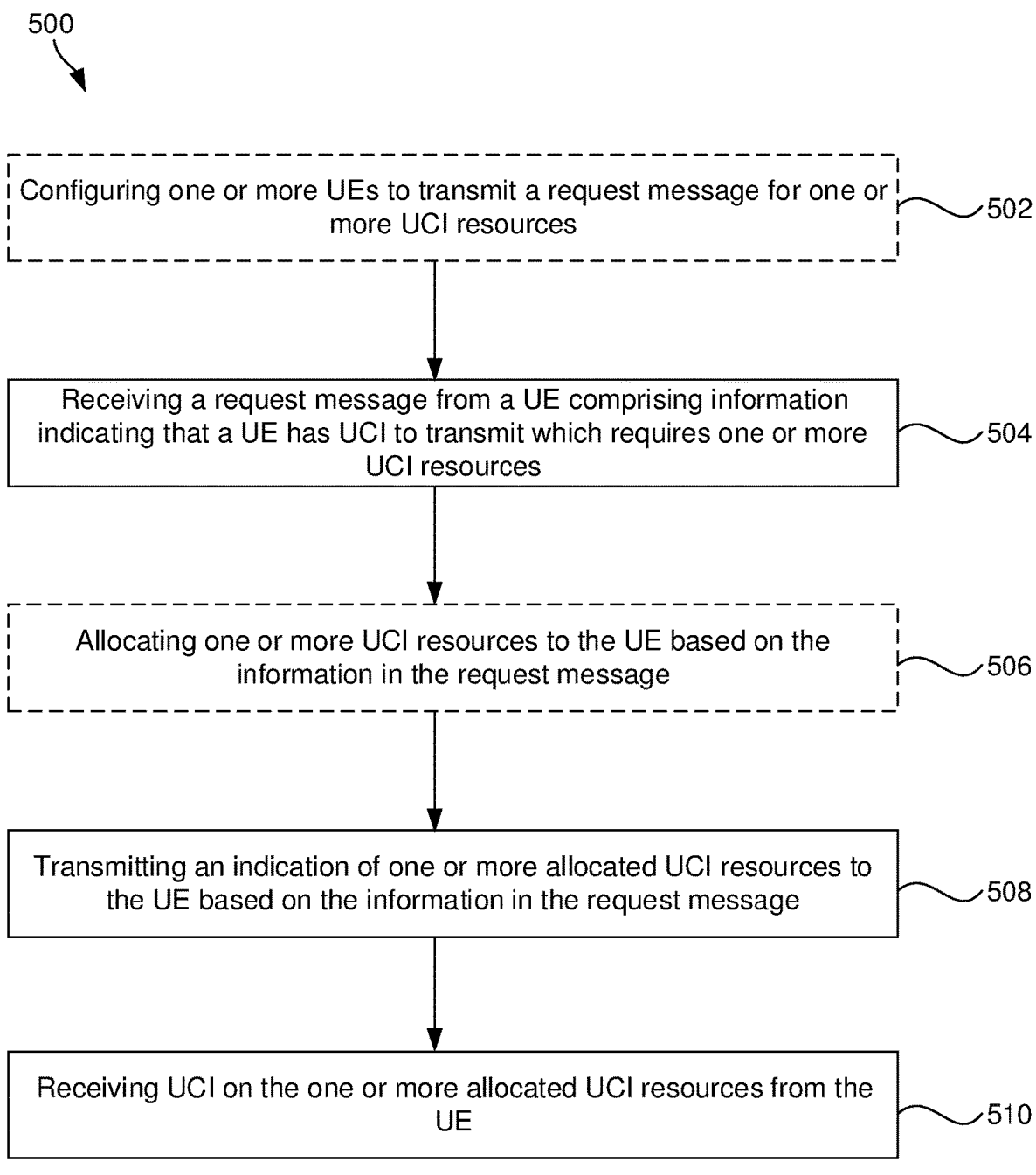

500

Configuring one or more UEs to transmit a request message for one or more UCI resources                                                    502

Receiving a request message from a UE comprising information indicating that a UE has UCI to transmit which requires one or more UCI resources                                                    504

Allocating one or more UCI resources to the UE based on the information in the request message                                                    506

Transmitting an indication of one or more allocated UCI resources to the UE based on the information in the request message                                                    508

Receiving UCI on the one or more allocated UCI resources from the UE                                                    510

Computing Environment 800

Control Unit
802

ALU
804

Data Processing Unit
806

Networking Devices
808

I/O Devices
810

Memory 812

Storage 814

RESOURCE ALLOCATION FOR TRANSMISSION OF UCI

CROSS-REFERENCE TO RELATED APPLICATION

This application is a Submission Under 35 U.S.C. § 371 for U.S. National Stage Patent Application of International Application Number: PCT/SE2021/050405, filed Apr. 30, 2021 entitled "RESOURCE ALLOCATION FOR TRANS-MISSION OF UCI," the entirety of which is incorporated herein by reference.

TECHNICAL FIELD

The present disclosure relates generally to the field of wireless communication. More particularly, it relates to method, user equipment, UE, network node and computer program products for resource allocation for transmission of uplink control information, UCI, in a wireless communica-tion network.

BACKGROUND

A communication system consists of a downLink, DL, supporting transmissions of signals from a base station to user equipments, UEs, and of an upLink, UL, supporting transmissions of signals from UEs to the base station. A UE, also commonly referred to as a terminal or a mobile station. The base station (i.e., a Node B) is generally a fixed station and may also be referred to as a base transceiver system, BTS, an access point, or the like.

The UL signals consist of data signals carrying the information content, control information, and reference sig-nals, RS, which are also known as pilot signals. The UEs convey UL data signals through a physical uplink shared channel, PUSCH. The UL signals having control informa-tion, termed as uplink control information, UCI, includes types of UCI which may include acknowledgement signals associated with application of hybrid automatic repeat request, HARQ, scheduling request, SR, signals, channel quality indicator, CQI, signals. A UE transmits the UCI to the base station to inform about the status of DL transmis-sions or about the need for uplink resources for transmission. The UCI may be transmitted on PUCCH or PUSCH.

The UE transmits an HARQ-ACK signal in response to data packet reception in the DL. Depending on whether the data packet reception is correct or incorrect, the HARQ-ACK signal has an ACK or a NAK value, respectively. The UE transmits an SR signal to request UL resources for signal transmission. The UE transmits a CSI signal to inform the base station of the DL channel conditions it experiences, enabling the base station to perform channel-dependent scheduling of DL data. A single UCI may include only HARQ or only SR and sometimes only CQI. Depending on situation, sometimes only CSI is transmitted, sometimes only SR only is transmitted and sometimes CSI and HARQ ACK or NACK is transmitted in the UCI.

The UCI is encoded and transmitted through the PUCCH or the UCI is multiplexed on the PUSCH. The CSI may be transmitted aperiodic (using the PUSCH), periodic (using the PUCCH), or semi-persistent (using the PUCCH). A CSI report comprises of two parts. A CSI part 1 has a fixed payload size and is used to identify the number of informa-tion bits in CSI part 2. The CSI part 1 is transmitted completely before the transmission of CSI part 2. The HARQ-ACK (if any) and the CSI (if any) is encoded and multiplexed with or without encoded UL data, and then transmitted on the PUSCH.

For example, a PUCCH resource set contains at least four PUCCH resource configurations, where each resource con-figuration contains a PUCCH format to use and all param-eters necessary for that format. Up to four PUCCH resource sets are configured for the UE and each of the PUCCH resource sets correspond to a certain range of UCI to be transmitted.

Thus, there exists a large number of PUCCH resources for the UE that are configured on a bandwidth part, BWP. For example, the UE may be configured with up to 8 PUCCH-SR resources on a BWP. Further on, up to 4 BWPs can be configured per UE. This means that relatively large amount of the resources in UL are used for PUCCH resources. Thus, PUCCH-SR configurations are also reserved on BWPs where the UE is not active.

Thus, a part of PUCCH allocation e.g., for SR (which is periodic and semi-persistent) may be inefficient in term of resources utilization since the UE does not utilize the resources, e.g., when there is no incoming data and when there is no need for scheduling request, and this leads to wastage of PUCCH resources. Further, when the base station is serving many UEs, and if each UE needs to send different types of UCIs, then there may be scarcity of PUCCH resources.

Consequently, there is a need for an improved method and arrangement for allocation of resources for transmission of UCI that alleviates at least some of the above cited prob-lems.

SUMMARY

It is therefore an object of the present disclosure to provide a method, a user equipment, a network node, and a computer program product for allocation of resources for transmission of UCI that seeks to mitigate, alleviate, or eliminate all or at least some of the above-discussed draw-backs of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for transmitting uplink control information, UCI, to a network node in a wireless communication network is provided. The method is performed by a user equipment, UE, in the wireless communication network. The method comprises transmitting a request message to the network node comprising information indicating that the UE has UCI to transmit which requires one or more UCI resources. The method comprises receiving an indication of one or more allocated UCI resources from the network node in response to the transmission of the request message. Further, the method comprises transmitting the UCI using the one or more allocated UCI resources.

In some embodiments, the method further comprising determining that UE has UCI to transmit which requires one or more UCI resources.

In some embodiments, the method further comprising transmitting a UE capability information message to the network node, wherein the UE capability information mes-sage indicates whether the UE is capable of transmitting the request message for the one or more UCI resources.

In some embodiments, the request message is transmitted based on one or more of: the UE capability information for requesting the one or more UCI resources, determining that the one or more UCI resources are required for transmission of the UCI, determining that there are no UCI resources for transmission of the UCI and reception of a request for the UCI from the network node.

In some embodiments, the information comprises one or more of: an indicator for the one or more UCI resources, one or more types of the UCI, priority assigned for each type of the UCI, a Physical Uplink Control Channel, PUCCH, format and a beam identifier, ID, for transmission of the UCI, a Bandwidth part, BWP, an encoding scheme, a cell identifier, subcarrier spacing, SCS, repetition indication for the one or more UCI resources.

In some embodiments, the request message is one of a random access channel, RACH, message, a PUCCH message or a PUSCH message, comprising the indicator for the one or more UCI resources, wherein the indicator is transmitted in one or more of: a medium access control, MAC sub-header, a MAC control element, MAC CE and a radio resource control, RRC, information element, IE.

In some embodiments, the RACH message is one of a message 1, MSG 1, or a message 3, MSG3, of a random access procedure.

In some embodiments, the request message is transmitted using a set of a dedicated PUCCH resources configured for the UE.

In some embodiments, the request message is transmitted using a set of a dedicated physical uplink shared channel, PUSCH, resources configured for the UE.

In some embodiments, the request message is transmitted using shared PUSCH resources configured for the UE. The request message comprises an identifier associated with the UE for transmitting the request message using the shared PUSCH resources.

In some embodiments, the request message is transmitted using a set of a dedicated sounding reference signals, SRS, resources configured for the UE.

In some embodiments, the UCI comprises multiple types of UCI comprising hybrid automatic repeat request, HARQ, information, channel state information, CSI, a scheduling request, SR and a buffer status report, BSR, wherein each type of the UCI in the request message is assigned with a priority for requesting the one or more UCI resources.

In some embodiments, the indication of the one or more allocated UCI resources is received in one or more of: a Downlink Control Information, DCI, message, a RRC message, a Medium Access Control, MAC, Control Element, MAC-CE, a system information block, SIB, message, and a message 2, MSG2, or a message 4, MSG 4 of the random access procedure. According to a second aspect of the present disclosure, a method for receiving uplink control information, UCI, from a user equipment, UE, in a wireless communication network is provided. The method is performed by a network node, for example, a base station in the wireless communication network. The method comprises receiving a request message from the UE comprising information indicating that the UE has UCI to transmit which requires one or more UCI resources. The method comprises transmitting an indication of one or more allocated UCI resources to the UE based on the information in the request message. Further, the method comprises receiving the UCI on the one or more allocated UCI resources from the UE.

In some embodiments, the method further comprising configuring one or more UEs to transmit a request message for one or more UCI resources.

In some embodiments, the method further comprising transmitting an indication to the UE whether the network node is capable of allocating one or more UCI resources in response to the request message.

In some embodiments, transmitting an indication of the one or more allocated UCI resources to the UE comprises allocating one or more UCI resources to the UE based on the information in the request message.

In some embodiments, the information comprises one or more of: an indicator for the one or more UCI resources, one or more types of the UCI, a priority indicator assigned for each type of the UCI, a PUCCH format and a selected beam identifier, ID, for transmission of the UCI, a Bandwidth part, BWP, an encoding scheme, a cell identifier, subcarrier spacing, SCS, repetition indication for the one or more UCI resources.

In some embodiments, the request message is a random access channel, RACH, message comprising the indicator for the one or more UCI resources, wherein the indicator is received one of a medium access control, MAC sub-header, a MAC control element, MAC CE and a radio resource control, RRC, information element, IE.

In some embodiments, the RACH message is one of a message 1, MSG 1 or a message 3, MSG3, of a random access procedure.

In some embodiments, the request message is received in a set of dedicated PUCCH resources configured for the UE.

In some embodiments, the request message is received in a set of dedicated PUSCH resources configured for the UE.

In some embodiments, the request message is received in shared PUSCH resources configured for the UE, wherein the request message includes an identifier associated with the UE when the request message is received in the shared PUSCH resources.

In some embodiments, the request message is received in a set of a dedicated sounding reference signals, SRS, resources configured for the UE.

In some embodiments, the one or more allocated UCI resources represent time-frequency resources indicating one or more of: a single PUCCH allocation, multiple PUCCH allocations with a pre-defined periodicity, a single PUSCH allocation, multiple PUSCH allocations with a pre-defined periodicity, a set of PUCCH resources, a periodicity for a scheduling request, and a slot-based or a sub-slot based PUCCH resource configuration.

According to a third aspect of the present disclosure, a user equipment, UE, for transmitting uplink control information, UCI, to a network node in a wireless communication network is provided. The UE being adapted for transmitting a request message to the network node comprising information indicating that the UE has UCI to transmit which requires one or more UCI resources. The UE being adapted for receiving an indication of one or more allocated UCI resources from the network node in response to the transmission of the request message. Further, the UE being adapted for transmitting the UCI using the one or more allocated UCI resources.

According to a fourth aspect of the present disclosure, there is provided a network node for receiving uplink control information, UCI, from a user equipment, UE, in a wireless communication network is provided. The network node being adapted for receiving a request message from the UE comprising information indicating that the UE has UCI to transmit which requires one or more UCI resources. The network node being adapted for transmitting an indication of one or more allocated UCI resources to the UE based on the information in the request message. Further, the network node being adapted for receiving the UCI on the one or more allocated UCI resources from the UE.

According to a fifth aspect of the present disclosure, there is provided a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

An advantage of some embodiments is that alternative and/or improved approaches are provided for resource allocation for transmission of UCI.

An advantage of some embodiments is that the PUCCH resources may be saved, particularly when a base station or a cell serving the UE is overloaded.

An advantage of some embodiments is that, the UE may transmit the request message for large-sized PUCCH resources instead of short-sized PUCCH resources, when the UE experiences a poor channel condition. For example, a HARQ ACK or a NACK may be transmitted with a long PUCCH format over larger resources, employing better code rate and thereby improving HARQ feedback reliability.

An advantage of some embodiments is that, the UE may transmit the request message for UCI resources with repetition which improves the reliability of the UCI.

An advantage of some embodiments is that, the UE may transmit the request message for desired PUCCH resources for HARQ feedback transmissions. For example, the UE may transmit HARQ-ACK or HARQ-NACK on sub-slot based configuration or slot-based configuration. Thus, the UE may request for desired PUCCH resources for HARQ feedback transmissions.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 2A and 2B are an example schematic diagrams showing allocation of resources for UE(s) according to some embodiments;

FIG. 3 is a flowchart illustrating example method steps for transmitting UCI to a network node according to some embodiments;

FIG. 5 is a flowchart illustrating example method steps for receiving UCI from the UE according to some embodiments;

DETAILED DESCRIPTION

Figure 1A:
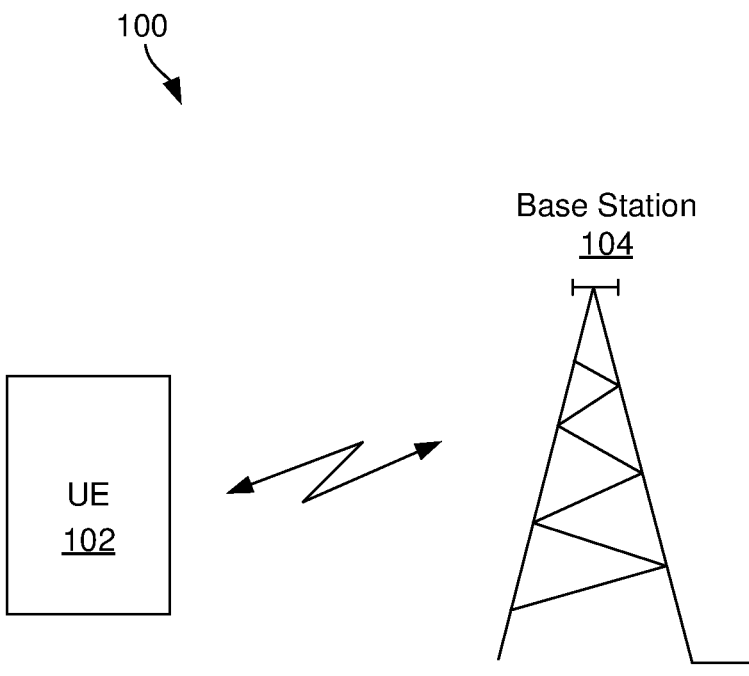
FIGS. 1A and 1B disclose an example wireless communication network according to some embodiments.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, user equipments, UEs, also known as mobile terminals, and/or wireless terminals are enabled to communicate wirelessly with a network node in a wireless communication network.

Typically, a network node may serve or cover one or several cells of the wireless communication network. That is, the network node provides radio coverage in the cell(s) and communicates over an air interface with the UE(s) operating on radio frequencies within its range. The network node may be also referred to as "eNB", "eNodeB", "NodeB" or "gNB", depending on the technology and terminology used. In the present disclosure, the network node device may also be referred to as a base station, BS.

In the present disclosure, it is assumed that connection establishment has already been completed between the UE(s) and the network node.

In the following description of exemplary embodiments, the same reference numerals denote the same or similar components.

Figure 1B:
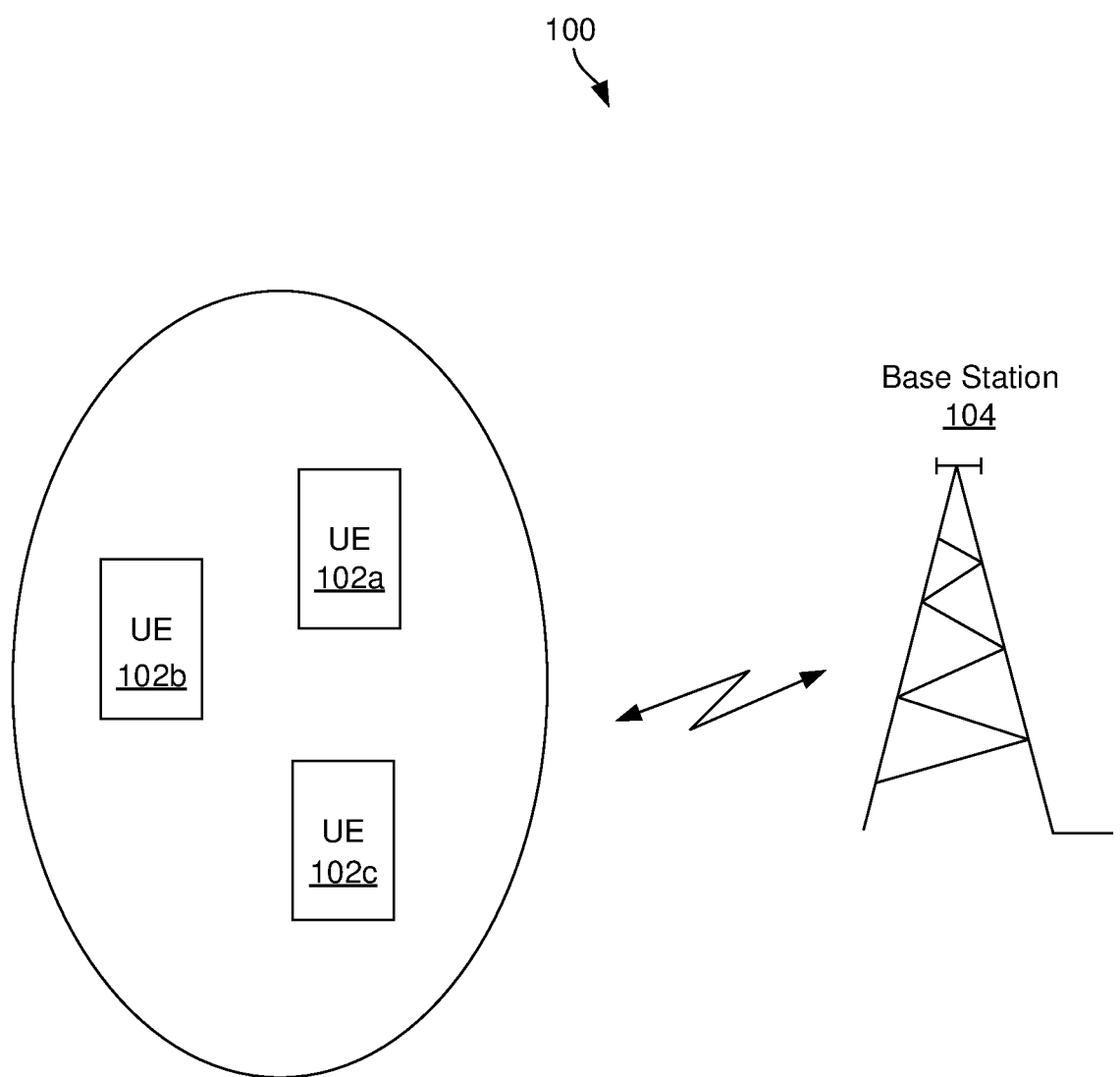

FIGS. 1A and 1B disclose an example wireless communication network 100. As depicted in FIG. 1A, the wireless communication network 100 includes a user equipment, UE 102 and a base station 104.

The base station 104 may be for example a new radio, NR, base station i.e., a gNB or an evolved node base station i.e., eNB, or the like. The UE 102 communicates with the base station 104 serving the UE 102. The communication from the base station 104 to the UE 102 is referred to as downlink, DL, communication, whereas communication from the UE to the base station is referred to as uplink, UL, communication. Thus, the UE 102 involves in bidirectional radio communication with the base station 104.

There may be a plurality of UEs 102a-102n in the coverage of the base station 104 as depicted in FIG. 1B. The plurality of UEs 102a-102n may belong to a group and the UEs 102a-102n in the group may be identified using a group ID.

The base station 104 comprises a scheduler for dynamically scheduling downlink transmissions and allocating uplink transmission resources among all the UEs 102a-10b communicating with the base station 104 as shown in FIG. 1B. The scheduler dynamically allocates resources for Physical Downlink Shared Channel, PDSCH, and Physical Uplink Shared Channel, PUSCH, data transmissions, and sends scheduling information to the UEs 102a-102n through a control channel.

To facilitate communications, a plurality of different communication channels are established between the base station 104 and UE 102 including, among other channels, a physical downlink control channel, PDCCH. The PDCCH is a channel that allows the base station to control a UE during downlink data communications. To this end, the PDCCH is used to transmit scheduling assignment or control information referred to as downlink control information, DCI, to the UE 102 to indicate scheduling to be used by the UE 102 to receive downlink communication on a physical downlink shared channel, PDSCH, or to transmit uplink communication on a physical uplink shared channel, PUSCH, or a physical uplink control channel, PUCCH.

In the case, when the UE 102 has data to be transmitted to the base station 104, the UE 102 transmits uplink signals consisting of data signals carrying the information content, control information, and Reference Signals, RS, which are also known as pilot signals. The UEs convey UL data signals through the PUSCH. The UL signals having control information, termed as Uplink Control information, UCI, includes types of UCI such as acknowledgement signals associated with the application of hybrid automatic repeat request, HARQ, scheduling request, SR, signals, channel quality indicator, CQI, signals. The UE 102 transmits the UCI to the base station 104 to inform about the status of DL transmissions or about the need for uplink resources for transmission. The UCI may be carried on PUCCH or PUSCH as described above.

However, there exists a large number of PUCCH resources for a UE that are configured on a BWP. For example, the UE may be configured with up to 8 PUCCH-SR resources on a BWP. Further on, up to 4 BWPs may be configured per UE which means that relatively large amount of the resources in UL are used for PUCCH resources. Therefore, a part of PUCCH allocation may be inefficient in term of resources utilization since the UE 102 does not utilize the PUCCH resources configured for the UE 102.

Therefore, according to some embodiments of the present disclosure, the UE 102 implements a method for efficiently utilizing the PUCCH resources for transmission of the UCI to the base station 104 as described herein. Alternatively, the base station 104 may implement the method for efficient allocation of the PUCCH resources to the UE 102 by configuring one or more UEs 102a-102n to transmit a request message for PUCCH resources based on UE capability information received from each of the UEs 102a-102n as shown in FIG. 1B. For example, the base station 104 allocates UCI resources to the UE 102 based on a request message for UCI resources received from the UE 102.

According to some embodiments of the present disclosure, the UE 102 determines that the UE 102 has UCI to transmit which requires one or more UCI resources. When the UE 102 determines that the UE 102 has UCI to transmit, the UE 102 transmits the request message to the base station 104 comprising information indicating that the UE 102 has UCI to transmit which requires one or more UCI resources. For example, the UE 102 transmits a request message based on UE capability information for requesting the one or more UCI resources, or when the UE 102 determines that the one or more UCI resources are required for transmission of the UCI, or when the UE 102 determines that the there are no UCI resources for transmission of the UCI or in response to a reception of a request for the UCI from the network node 104. Thus, the UE 102 transmits the request message based on one or more of the above mentioned conditions.

The information in the request message comprises an indicator, one or more types of the UCI, priority assigned for each type of the UCI, a PUCCH format and a beam identifier, ID, for transmission of the UCI, a Bandwidth part, BWP, an encoding scheme, a cell identifier, subcarrier spacing, SCS, repetition indication for the one or more UCI resources, or the like.

Further, the UE 102 receives an indication of one or more allocated UCI resources from the network node 104 in response to the transmission of the request message to the base station 104. The indication of the allocated UCI resources may be received in a DCI message, a radio resource control, RRC message, a medium access control, MAC, control element, MAC-CE, a system information block, SIB, message, and a message 2, MSG2, or a message 4, MSG 4 of the random access procedure.

For example, the base station 104 may transmit each DCI message to each of the UEs 102a-102n for indicating the allocated UCI resources or a group-common DCI message may be transmitted to the plurality of the UEs 102a-102n in the group (as shown FIG. 1B) for indicating the one or more allocated UCI resources.

Further, the UE 102 transmits the UCI using the allocated one or more UCI resources.

The UE 102 may transmit the request message with information indicating that the UE 102 UE requires UCI resources for transmission of UCI through one or more signaling alternatives. Various embodiments for transmitting or signaling the request message to the base station 104 for requesting the UCI resources is explained in the later parts of the disclosure.

Figure 2B:
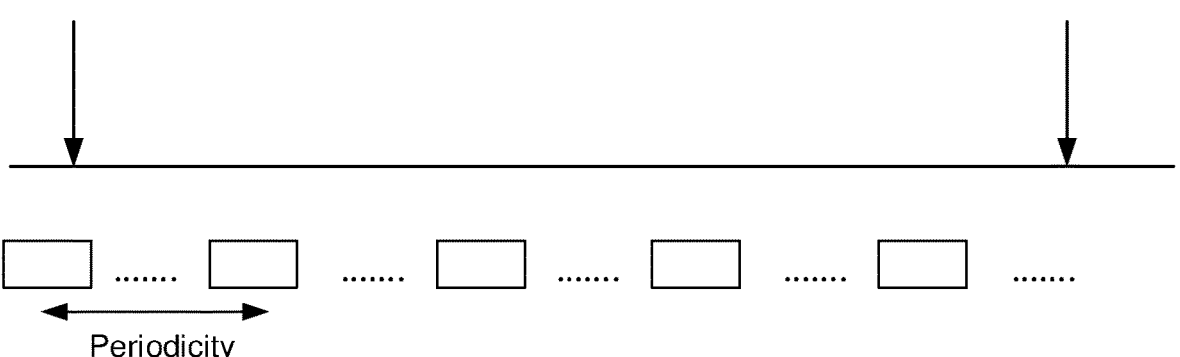

FIGS. 2A and 2B are example schematic diagrams showing allocation of resources for transmission of UCI. The base station allocates one or more UCI resources based on the information in the request message received from the UE and the UE uses the allocated UCI resources indicated by the base station for transmitting the UCI. For example, the UE uses a UL resource grid 200 (as shown in FIG. 2A) to transmit the UCI (e.g., HARQ ACK or NACK, CSI and/or scheduling requests) to the base station. The UE may receive subframe type configuration information from the base station, the subframe type configuration information configuring UL transmissions of certain types of UCI using a subframe type.

The UL resource grid 200 is to be transmitted over a subframe 205 having a duration of 1 milli-second, ms. The subframe 205 contains fourteen SC-FDMA symbols. As depicted, the 1 ms subframe 205 includes two slots: A first slot 210 and a second slot 215 corresponding to slots 225 and 230 respectively as shown in FIG. 2A. Each of the slots 210 and 215 contain seven SC-FDMA symbols, and each of the slots 210 and 215 have a duration of 0.5 ms. Further, the UL resource grid 200 includes a plurality of physical resource blocks 220. Each physical resource block 220 contains a number of subcarriers.

By default, the UE transmits the UCI on the normal uplink control channel (e.g., normal PUCCH 240) using a subframe of the legacy TTI subframe type (e.g., the 1 ms subframe 205). However, the UE transmits UCI on an uplink data channel (e.g., PUSCH) using a subframe if the base station allocates resources to the UE on the uplink data channel at the beginning of the subframe 205 (e.g., allocates PUSCH 235 during the first slot 225).

The UE may be allocated with uplink periodic PUCCH resources without the need for transmission of additional grants by the base station. An example periodic PUCCH resource allocation is shown in FIG. 2B.

FIG. 3 is a flowchart illustrating an example method 300 for transmitting UCI to the network node (i.e., the base station). As stated above, the UE performs the method 300 for transmitting the UCI to the base station in the wireless communication network. The UCI comprises multiple types of UCI comprising HARQ information, CSI, SR and a buffer status report, BSR. The UE transmits one or more types of the UCI to the base station using the allocated UCI resources indicated by the base station.

The allocated one or more UCI resources represent time-frequency resources indicating a single PUCCH allocation, multiple PUCCH allocations with a pre-defined periodicity, a single PUSCH allocation, multiple PUSCH allocations with a pre-defined periodicity, a set of PUCCH resources and a slot-based or a sub-slot based PUCCH resource configuration.

At step 304, the method 300 comprises transmitting a request message to the network node comprising information indicating that the UE has UCI to transmit which requires one or more UCI resources. For example, the UE transmits the request message to the base station when the UE is capable of transmitting the request message for requesting the UCI resources from the base station. The UE capability information message indicates whether the UE is capable of transmitting the request message for the one or more UCI resources. Thus, the UE transmits the request message when the UE is capable of transmitting the request message for the one or more UCI resources.

In another example, the UE transmits the request message to the base station when the UE determines that the one or more UCI resources are required for transmission of the UCI or when the UE determines that there are no UCI resources for transmission of the UCI. In yet another example, the UE transmits the request message to the network node for UCI resources in response to reception of request for the UCI from the network node. The UE may transmit the request message based on one or more of the above mentioned conditions.

Thus, the UE determines that the UE has UCI to transmit which requires one or more UCI resources as illustrated by the optional step 302 and based on the determination, the UE transmits the request message to the base station.

The information in the request message indicates the network node about the need for the one or more UCI resources for the UE for transmission of the UCI.

In an embodiment, the information in the request message comprises one or more of: an indicator for requesting the one or more UCI resources, one or more types of the UCI, priority assigned for each type of the UCI, a Physical Uplink Control Channel, PUCCH, format and a beam identifier, ID, for transmission of the UCI, a Bandwidth part, BWP, an encoding scheme, a cell identifier, subcarrier spacing, SCS, repetition indication for the UCI resources, or the like. For example, the indicator in the request message indicates that the UE has UCI to transmit which requires one or more UCI resources. The indicator is transmitted in a medium access control, MAC sub-header, a MAC control element, MAC CE and a radio resource control, RRC, information element, IE, or the like. It should be noted that the indicator can be a flag, a bit or an identifier, or the like.

In some embodiments, the request message may not necessarily include the indicator and in such cases, the request message is transmitted in a resource element of a resource grid and the base station identifies that the request message is for UCI resources.

In an example, types of the UCI include HARQ, information, CSI, SR and BSR. The UE transmits the request message with one or more types of the UCI. For example, the UE may transmit the request message with type of UCI as CSI for UCI resources to transmit only CSI to the network node. In another example, the UE may transmit the request message with multiple types of UCI including CSI and SR for UCI resources to transmit both CSI and SR to the network node. Thus, the UE may transmit the request message indicating one or more types of UCI for the UCI resources from the network node.

In some examples, the UE may transmit the request message with the one or more UCI types along with a priority indicator assigned for each of the UCI type. For example, a first UE may transmit the request message with the UCI types as SR along with a priority indicator for the SR and the HARQ information. A second UE may transmit the request message with the UCI types as SR along with a priority indicator for the SR. In such a case, one of the first UE and the second UE may receive the UCI resources for transmitting the SR, based on the priority indicator transmitted in the request message. Therefore, when multiple UEs require UCI resources for transmitting one or more UCI types, then each of the UE may transmit the request message with the priority indicator assigned for each of the UCI type.

In some examples, the UE may transmit the request message with a PUCCH format for the one or more UCI resources. The UE may select the PUCCH format and transmits the request message to the network node for the one or more UCI resources based on that PUCCH format. As the UE is aware of the amount/size/volume of HARQ feedback information bits and type (e.g., Type-1 or Type-2 or one-shot) or CSI, the UE may select appropriate PUCCH format. For example, if the UE intends to report only 1 or 2 bits of HARQ-ACK bits, then the UE selects short PUCCH (e.g., PUCCH format 0 or 2). However, if the HARQ feedback includes information bits of multiple component carries then the UE selects long PUCCH (e.g. PUCCH format 3, or 4). Thus, the UE may transmit a selected PUCCH format in the request message for the one or more UCI resources.

Further, in some examples, along with request message for the one or more UCI resources, the UE may indicate the network node (i.e., gNB) about a beam direction for UCI transmission. Thus, the UE may transmit the request message with beam identifier associated with a selected beam for UCI transmission.

It should be noted that the request message may be transmitted or signaled to the network node using one or more alternatives as described herein.

In an embodiment, when the UE performs a random access procedure (i.e., a 2-step random access procedure) with the base station, the UE transmits a RACH message which is a message 1, MSG 1. During the 2-step random access procedure, the UE transmits the MSG1 with an indicator for indicating that the UE requires UCI resources. When the UE transmits MSG1 with the indicator, the UE receives MSG2 with an indication of the allocated resources for UCI transmission. Thus, the UE transmits the request message with an indicator (indicating that the UE is requesting PUCCH resources) which is included explicitly or inexplicitly in the MSG1 of the random access procedure.

In an example, the UE is assigned with dedicated RA preambles or RACH occasions in frequency domain or in time domain for transmitting the request message for PUCCH resources.

In another example, the indicator is a MAC sub header occupying a new field, or an existing field or the indicator is a MAC CE (i.e., a new MAC CE or repurpose an existing MAC CE).

In another embodiment, when the UE performs a random access procedure (i.e., a 4-step random access procedure) with the base station, the UE transmits a RACH message which is a message 3, MSG 3. During the 4-step random access procedure, the UE transmits the MSG3 with an indicator for indicating that the UE requires one or more UCI resources. When the UE transmits MSG3 with the indicator, the UE receives MSG4 with an indication of the allocated resources for UCI transmission. Thus, the UE transmits the request message with an indicator (indicating that the UE is requesting PUCCH resources) which is included explicitly or inexplicitly in the MSG3 of the random access procedure.

In another embodiment, the request message is transmitted using a set of a dedicated PUCCH resources configured for the UE. For example, the UE may be configured with a minimum set of PUCCH resources which are dedicatedly allocated to the UE. The UE uses the set of PUCCH resources for transmitting the request message for UCI resources from the network node. Alternatively, the minimum set of PUCCH resources are shared among multiple UEs and the UE may use the set of PUCCH resources for transmitting the request message for UCI resources from the network node.

In some embodiments, the request message is transmitted using a set of PUSCH resources configured for the UE. For example, the UE may be configured with a minimum set of PUSCH resources which are dedicatedly allocated to the UE. The UE uses the set of PUSCH resources for transmitting the request message for UCI resources from the network node. Alternatively, the minimum set of PUCCH resources are shared among multiple UEs and the UE may use the set of PUSCH resources for transmitting the request message for UCI resources from the network node. When request message is transmitted using shared PUSCH resources configured for the UE, the request message comprises an identifier associated with the UE.

In some embodiments, the UE transmits the request message using a set of a dedicated sounding reference signals, SRS, resources configured for the UE. For example, dedicated SRS resources may be allocated to the UE for transmitting the request for UCI resources from the network node.

Thus, the UE may transmit the request message for UCI resources using any of the above mentioned alternatives.

At step 306, the UE receives an indication of one or more allocated UCI resources from the network node in response to the transmission of the request message. For example, the UE receives the indication of the one or more allocated UCI resources in one or more of: a DCI message, a RRC message, a MAC-CE, a SIB message and a message 2, MSG2, or a message 4, MSG 4 of the random access procedure.

The one or more UCI resources are PUCCH resource allocations or PUSCH resource allocations over which the UCI is to be transmitted. Thus, the allocated UCI resources may be PUCCH resources or PUSCH resources or combination of PUCCH resources and PUSCH resources.

At step 308, the UE transmits the UCI using the one or more allocated UCI resources. The UCI which include SR, CSI, HARQ feedback, RACH transmission, etc. are transmitted over the allocated UCI resources indicated by the base station.

Figure 4:
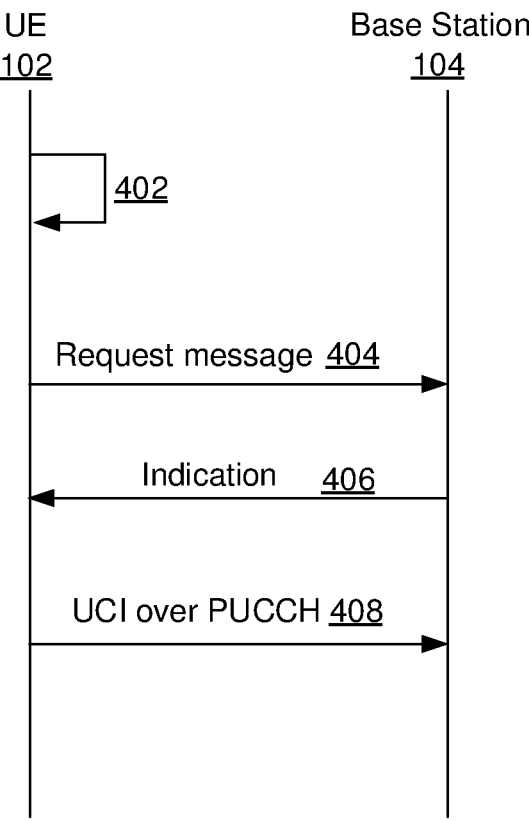
FIG. 4 is a signalling diagram illustrating example signaling according to some embodiments.

FIG. 4 is a signalling diagram illustrating example signaling according to some embodiments. As depicted in FIG. 4, the UE 102 determines 402 that that UE 102 has UCI to transmit which requires one or more UCI resources. For example, the UE 102 determines that one or more UCI resources are required when there are no UCI resources available for transmission of the UCI.

The UE 102 transmits 404 the request message to the base station 104 with the information indicating that the UE 102 has UCI to transmit which requires one or more UCI resources. As described above, the request message comprises an indicator for the one or more UCI resources, one or more types of the UCI, priority indicator assigned for each type of the UCI, a PUCCH, format and a beam ID, for transmission of the UCI, a Bandwidth part, BWP, an encoding scheme, a cell identifier, subcarrier spacing, SCS, repetition indication for the one or more UCI resources.

Further, the request message may be transmitted to the base station 104 using any of the signaling alternatives such as a RACH message (i.e., in MSG1) in a 2-step random access procedure or as a RACH message (i.e., in MSG3) in a 4-step random access procedure. The request message may be a transmitted as a PUCCH message or a PUSCH message.

In some embodiments, the request message may be transmitted to the base station 104 using a set of dedicated PUCCH resources configured for the UE 102 or using a set of dedicated PUSCH resources configured for the UE 102 or using a set of SRS resources configured for the UE 102.

The UE 102 receives 406 an indication of one or more allocated UCI resources from the network node in response to the transmission of the request message as shown in FIG. 4. For example, the UE receives the indication of the allocated UCI resources in a DCI message, a RRC message, a MAC-CE, a SIB message, and a MSG2, or a MSG 4 of the random access procedure.

Further, the UE 102 transmits 408 the UCI using the one or more allocated UCI resources. For example, the UE may transmit the UCI using the PUCCH resources or PUSCH resources or a combination of PUCCH resources and PUSCH resources indicated by the base station 104.

FIG. 5 is a flowchart illustrating example method steps for receiving the UCI from the UE. The base station 104 performs a method 500 for receiving the UCI from the UE.

At step 504, the method 500 comprises receiving a request message from the UE comprising information indicating that the UE has UCI to transmit which requires UCI resources. The information in the request message indicates the base station that the UE requires UCI resources for transmission of UCI. For example, the information includes an indicator for the one or more UCI resources, one or more types of UCI, priority indicator assigned for each type of the UCI, a PUCCH format, a beam ID for transmission of UCI, a Bandwidth part, BWP, an encoding scheme, a cell identifier, subcarrier spacing, SCS, repetition indication for the UCI resources, or the like. It should be noted that the indicator can be a flag, a bit or an identifier, or the like.

In some embodiments, the request message may not necessarily include the indicator and in such cases, the request message is received in a resource element of a resource grid and the base station identifies that the request message is for UCI resources.

The base station may configure one or more UEs for transmitting the request message for the one or more UCI resources as illustrated by optional step 502. For example, the base station may configure one or more UEs for transmitting the request message based on UE capability information received from each of the UEs. The base station determines whether the UE is capable of transmitting the request message based on the UE capability information received from each of the UEs. Thus, the base station configures one or more UEs for transmitting the request message for the one or more UCI resources. Further, when the base station receives the request message from each of the UEs, the base station may transmit an indication to the one or more UEs whether the network node is capable of allocating one or more UCI resources in response to the request message.

In an embodiment, the base station may receive the request message from the UE using any of the signaling alternatives such as a RACH message (i.e., in MSG1) of a 2-step random access procedure or as a RACH message (i.e., in MSG3) of a 4-step random access procedure. Further, the request message may be a transmitted as a PUCCH message or a PUSCH message.

Further, the request message may be received from the UE on a set of dedicated PUCCH resources configured for the UE or on a set of dedicated PUSCH resources configured for the UE or on a set of SRS resources configured for the UE.

At step 508, the method 500 comprises transmitting an indication of one or more allocated UCI resources to the UE based on the information in the request message.

In an embodiment, the base station allocates one or more UCI resources to the UE based on the information received in the request message as illustrated by the optional step 506. For example, the base station may receive the request message with information indicating type of UCI as CSI for UCI resources to transmit only CSI to the base station. In another example, the base station may receive the request message with multiple types of UCI including CSI and SR for UCI resources to transmit both CSI and SR. Thus, the base station allocates the UCI resources based on the information received in the request message.

In some examples, the base station may receive the request message with the one or more UCI types along with a priority indicator assigned for each of the UCI type. For example, the base station may receive the request message from a first UE with the UCI types as SR along with a priority indicator for the SR and the HARQ information. Further, the base station may receive the request message from a second UE with the UCI types as SR along with a priority indicator for the SR. In such a case, the base station may allocate the UCI resources to one of the first UE and the second UE for transmitting the SR, based on the priority indicator in the request message.

Further, the base station transmits the indication of one or more allocated UCI resources to the UE. For example, the bases station transmits the indication of the one or more allocated UCI resources to the UE in a DCI message, a RRC message, a MAC-CE, a SIB, message, and a MSG2, or a MSG 4 of the random access procedure.

At step 510, the method 500 comprises receiving the UCI on the one or more UCI resources allocated to the UE. The base station receives the UCI from the UE on the one or more UCI resources allocated to the UE.

Figure 6:
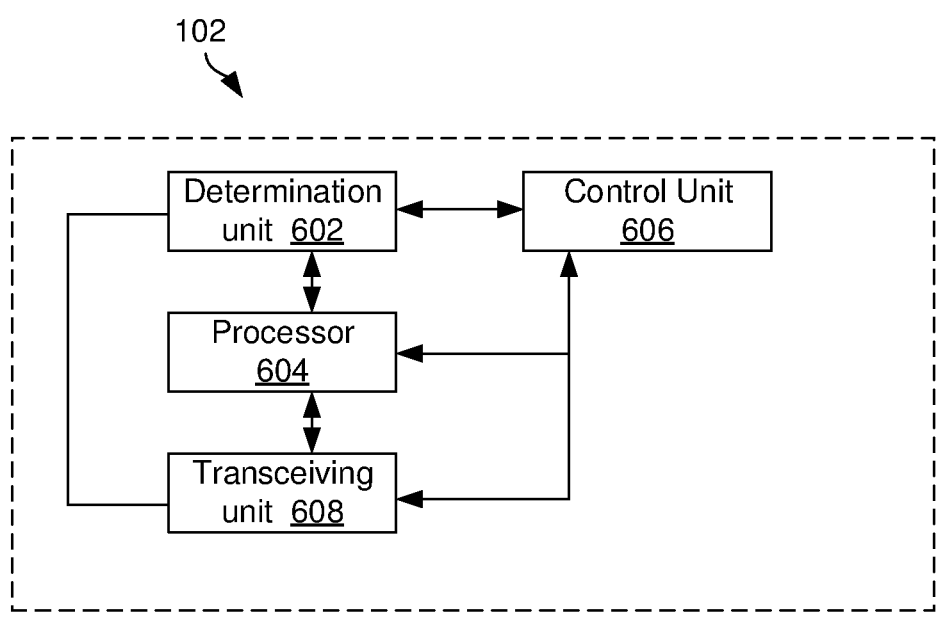
FIG. 6 is an example schematic diagram showing functional modules of the UE according to some embodiments.

FIG. 6 is an example schematic diagram showing functional modules of a UE for transmitting the UCI. The UE of the wireless communication network is capable of transmitting request message for the one or more UCI resources, may comprise means arranged to perform the method for transmitting the UCI to the base station.

According to at least some embodiments of the present invention, the UE 102 in FIG. 6 comprises a determination unit 602, a processor 604, and a transceiving unit 608. In addition, the UE 102 may also comprise a control unit 606, adapted to control said units.

It can be mentioned that the determination unit 602 may be merged into the processor 604, which may be called a data processing unit, potentially also covering the control unit 606.

The determination unit 602, and the transceiving unit 608 as well as the control unit 606, may be operatively connected to each other.

The function of the determination unit 602, when encompassed by the processing unit, may be performed by determining means of the processing unit.

Optionally, the determination unit 602 may be adapted to determine that UE 102 has UCI to transmit which requires UCI resources. The transceiving unit 608 may be adapted to transmit the request message to the base station with the information indicating that the UE 102 has UCI to transmit which requires one or more UCI resources.

The transceiving unit 608 may be adapted to transmit the request message based on the UE capability information for transmitting the request message or when the one or more UCI resources are required for transmission of the UCI, or when there no UCI resources for transmission of the UCI, or in response to reception of request from UCI from the base station As described above, the request message may be transmitted in various ways, a few of which have been mentioned above in connection to the explanation of FIG. 3.

The transceiving unit 608 may be adapted to receive the indication of one or more allocated UCI resources, for example, the DCI message or a MAC-CE or a RRC message from the base station. The UE 102 may further comprise a control unit 608 adapted to control the steps as executed by the UE 102.

In addition, the transceiving unit 606 is also adapted to transmit the UCI using the allocated UCI resources, under the control of the control unit 608, to the base station.

Figure 7:
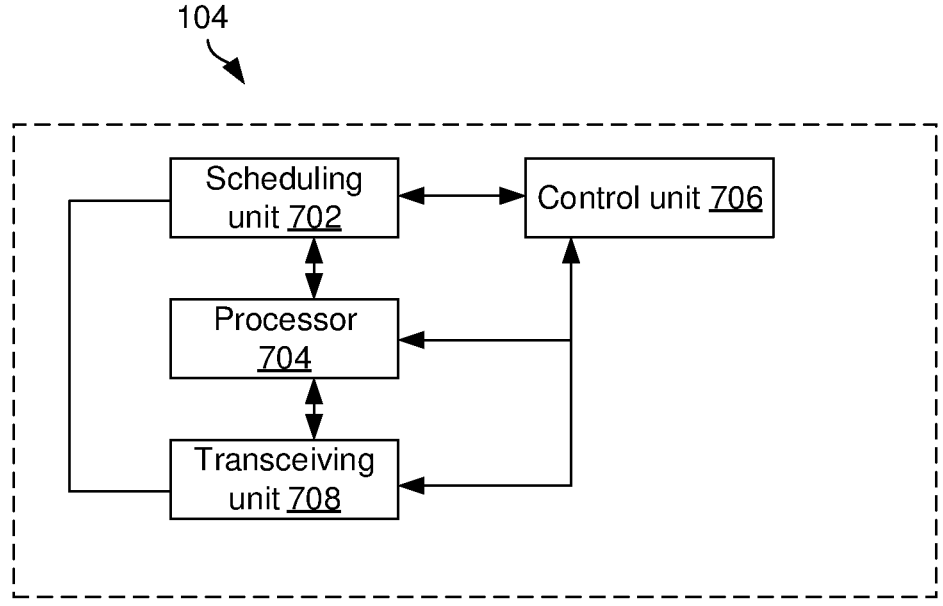
FIG. 7 is an example schematic diagram showing functional modules of the network node according to some embodiments.

FIG. 7 is an example schematic diagram showing functional modules of the network node for receiving the UCI resources. The network node in the form of a base station of a wireless communication network is capable of configuring the one or more UEs to transmit the request message for UCI resources and receives the UCI from the one or more UEs. The network node 104 may comprise means arranged to perform the method 500 for receiving the UCI.

According to at least some embodiments of the present disclosure, the base station 104 as illustrated in FIG. 7 may comprise a scheduling unit 702, a processor 704, and a transceiving unit 708. In addition, the base station 104 may also comprise a control unit 706, adapted to control said units.

The scheduling unit 702 may be adapted to allocate the one or more UCI resources which may be a UL grant for the UE for transmitting the UCI. The UCI resources may be PUCCH resources, PUSCH resources or a combination of PUCCH resources and PUSCH resources.

The processor 704 which may be considered as a data processing unit, may be adapted to generate an indication, for example, in a DCI message, for indicating the allocated UCI resources.

The transceiving unit 708 may be adapted to receive the request message comprising the information indicating that the UE has UCI to transmit which requires UCI resources, corresponding to the step 504 of FIG. 5.

Further, the transceiving unit 708 may be adapted to transmit the indication (i.e., the DCI message or a MAC CE) of one or more allocated UCI resources to the UE, corresponding to step 508 as presented in FIG. 5. The transceiving unit 708 may be adapted to receive the UCI on the one or more allocated UCI resources from the UE, corresponding to the step 510 as presented in FIG. 5.

The scheduling unit 702, and the transceiving unit 708 may be operatively connected to each other enabling the function of each of the units.

The scheduling unit 702 may be comprised in one processing unit, which additionally also may comprise the control unit 706. The function of the scheduling unit 702 may in this case be performed by scheduling means of a data processing unit.

Figure 8:
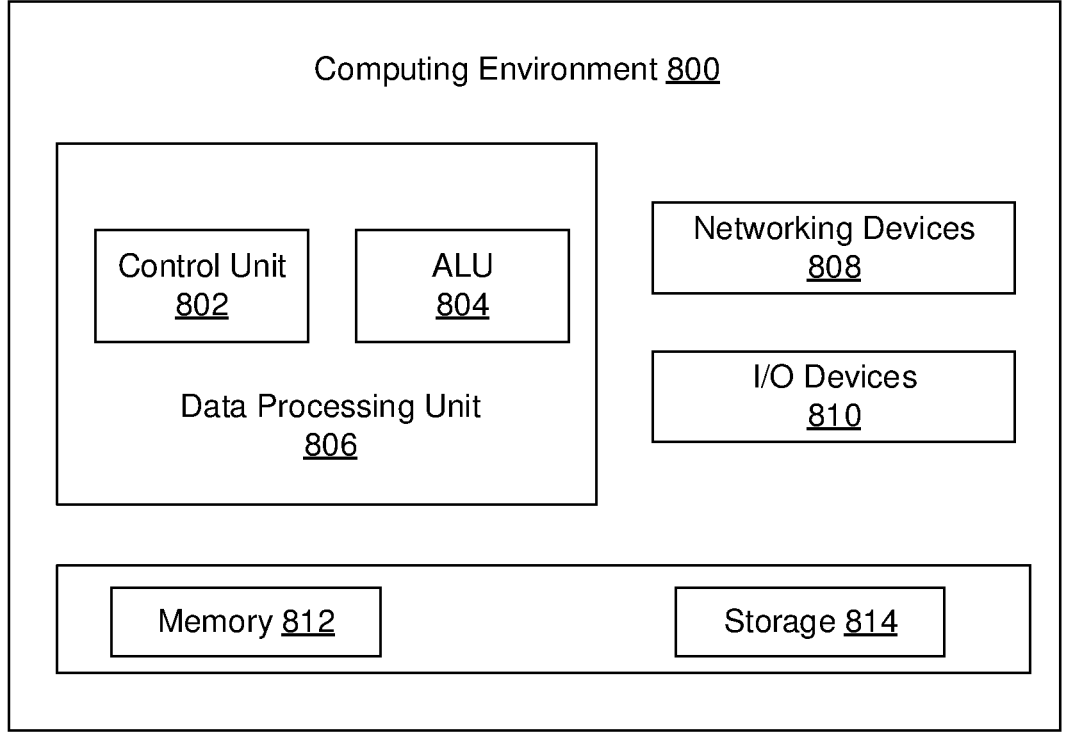
FIG. 8 discloses an example computing environment according to some embodiments.

FIG. 8 illustrates an example computing environment 800 implementing a method and the network node and the UE for resource allocation for transmission of UCI as described in FIG. 3 and FIG. 5. As depicted in FIG. 8, the computing environment 800 comprises at least one data processing unit 806 that is equipped with a control unit 802 and an Arithmetic Logic Unit, ALU 804, a memory 812, a storage 814, plurality of networking devices 808 and a plurality Input output, I/O devices 810. The data processing unit 806 is responsible for processing the instructions of the algorithm. For example, the data processing unit 806 is equivalent to the processor of the network node. The data processing unit 806 is capable of executing software instructions stored in memory 812. The data processing unit 806 receives commands from the control unit 802 in order to perform its processing. Further, any logical and arithmetic operations involved in the execution of the instructions are computed with the help of the ALU 804.

The computer program is loadable into the data processing unit 806, which may, for example, be comprised in an electronic apparatus (such as a UE or a network node). When loaded into the data processing unit 806, the computer program may be stored in the memory 812 associated with or comprised in the data processor. According to some embodiments, the computer program may, when loaded into and run by the data processing unit 806, cause execution of method steps according to, for example, any of the methods illustrated in FIGS. 3 and 5 or otherwise described herein The overall computing environment 800 may be composed of multiple homogeneous and/or heterogeneous cores, multiple CPUs of different kinds, special media and other accelerators. The data processing unit 806 is responsible for processing the instructions of the algorithm. Further, the plurality of data processing units 806 may be located on a single chip or over multiple chips.

The algorithm comprising of instructions and codes required for the implementation are stored in either the memory 812 or the storage 814 or both. At the time of execution, the instructions may be fetched from the corresponding memory 812 and/or storage 814, and executed by the data processing unit 806.

In case of any hardware implementations various networking devices 808 or external I/O devices 810 may be connected to the computing environment to support the implementation through the networking devices 808 and the I/O devices 810.

The embodiments disclosed herein can be implemented through at least one software program running on at least one hardware device and performing network management functions to control the elements. The elements shown in FIG. 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for transmitting uplink control information, UCI, to a network node in a wireless communication network, the method being performed by a user equipment, UE, the method comprising:
   transmitting a request message to the network node comprising information indicating that the UE has UCI to transmit which requires one or more UCI resources;
   receiving an indication of one or more allocated UCI resources from the network node in response to the transmission of the request message; and
   transmitting the UCI using the one or more allocated UCI resources, wherein the UCI comprises multiple types of UCI comprising hybrid automatic repeat request, HARQ, information, channel state information, CSI, a scheduling request, SR and a buffer status report, BSR, wherein each type of the UCI in the request message is assigned with a priority indicator for requesting the one or more UCI resources.

2. The method according to claim 1, further comprising:
   determining that the UE has UCI to transmit which requires one or more UCI resources.

3. The method according to claim 1, further comprising:
   transmitting a UE capability information message to the network node, wherein the UE capability information message indicates whether the UE is capable of transmitting the request message for the one or more UCI resources.

4. The method according to claim 1, wherein the request message is transmitted based on one or more of: the UE capability information for requesting the one or more UCI resources, determining that the one or more UCI resources are required for transmission of the UCI, determining that there are no UCI resources for transmission of the UCI and reception of a request for the UCI from the network node.

5. The method according to claim 1, wherein the information comprises one or more of: an indicator for the one or more UCI resources, the one or more types of the UCI, priority assigned for each type of the UCI, a Physical Uplink Control Channel, PUCCH, format and a beam identifier, ID, for transmission of the UCI, a Bandwidth part, BWP, an encoding scheme, a cell identifier, subcarrier spacing, SCS, repetition indication for the one or more UCI resources.

6. The method according to claim 1, wherein the request message is one of a random access channel, RACH, message, a PUCCH message or a PUSCH message, comprising the indicator for the one or more UCI resources, wherein the indicator is transmitted in one or more of: a medium access control, MAC sub-header, a MAC control element, MAC CE and a radio resource control, RRC, information element, IE.

7. The method according to claim 6, wherein the RACH message is one of a message 1, MSG 1, or a message 3, MSG3, of a random access procedure.

8. The method according to claim 1, wherein the request message is transmitted using one of:

a set of a dedicated PUCCH resources configured for the UE;

a set of a dedicated physical uplink shared channel, PUSCH, resources configured for the UE; or a set of a dedicated sounding reference signals, SRS, resources configured for the UE.

9. The method according to claim 1, wherein the request message is transmitted using shared PUSCH resources configured for the UE, wherein the request message comprises an identifier associated with the UE for transmitting the request message using the shared PUSCH resources.

10. The method according to claim 1, wherein the indication of the one or more allocated UCI resources is received in one or more of: a Downlink Control Information, DCI, message, a RRC message, a Medium Access Control, MAC, Control Element, MAC-CE, a system information block, SIB, message, and a message 2, MSG2, or a message 4, MSG 4 of the random access procedure.

11. A user equipment (UE) comprising a hardware processor and a controller, the UE for transmitting uplink control information, UCI, to a network node in a wireless communication network, the UE configured for:

transmitting a request message to the network node comprising information indicating that the UE has UCI to transmit which requires one or more UCI resources;

receiving an indication of one or more allocated UCI resources from the network node in response to the transmission of the request message; and transmitting the UCI using the one or more allocated UCI resources, wherein the UCI comprises multiple types of UCI comprising hybrid automatic repeat request, HARQ, information, channel state information, CSI, a scheduling request, SR and a buffer status report, BSR, wherein each type of the UCI in the request message is assigned with a priority indicator for requesting the one or more UCI resources.

* * * * *